(12) United States Patent
Salter et al.

(10) Patent No.: US 12,031,374 B2
(45) Date of Patent: Jul. 9, 2024

(54) VEHICLE HAVING IMAGING DEVICE FOR DRIVER AND WINDOW MONITORING

(71) Applicant: Ford Global Technologies, LLC, Dearborn, MI (US)

(72) Inventors: Stuart C. Salter, White Lake, MI (US); Michael John Kipley, Saline, MI (US); Adrian Aguirre, Alvaro Obregon (MX); Pietro Buttolo, Dearborn Heights, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 17/404,293

(22) Filed: Aug. 17, 2021

(65) Prior Publication Data

US 2023/0057766 A1 Feb. 23, 2023

(51) Int. Cl.
| | |
|---|---|
| *E05F 15/71* | (2015.01) |
| *B60J 7/043* | (2006.01) |
| *B60R 11/00* | (2006.01) |
| *B60R 11/04* | (2006.01) |
| *E05F 15/60* | (2015.01) |
| *G06V 20/59* | (2022.01) |

(52) U.S. Cl.
CPC .............. *E05F 15/71* (2015.01); *B60J 7/043* (2013.01); *B60R 11/04* (2013.01); *G06V 20/59* (2022.01); *B60R 2011/0005* (2013.01); *E05F 15/60* (2015.01); *E05Y 2400/32* (2013.01); *E05Y 2400/44* (2013.01); *E05Y 2400/45* (2013.01); *E05Y 2900/542* (2013.01)

(58) Field of Classification Search
CPC ........... E05F 15/71; B60J 7/043; B60R 11/04; G06V 20/59; G06V 40/16; E05Y 2900/542

See application file for complete search history.

(56) References Cited

U.S. PATENT DOCUMENTS

| | | | |
|---|---|---|---|
| 6,748,308 B2 | 6/2004 | Losey | |
| 7,027,621 B1 * | 4/2006 | Prokoski | .............. G06V 40/165 340/576 |
| 10,329,829 B2 | 6/2019 | Matsui et al. | |
| 2005/0074142 A1 | 4/2005 | Ertl et al. | |
| 2007/0192038 A1 * | 8/2007 | Kameyama | ........... G06F 16/436 707/E17.143 |

(Continued)

FOREIGN PATENT DOCUMENTS

CN 108382172 A * 8/2018 ............ B60J 7/0573

*Primary Examiner* — Ig T An
(74) *Attorney, Agent, or Firm* — Vichit Chea; Price Heneveld LLP

(57) ABSTRACT

A vehicle is provided that includes a cabin interior, a seat configured to hold a passenger, a window having a movable panel actuatable between open and closed positions, and an actuator to power the window between the open and closed positions. The vehicle also includes an imaging device located in the cabin interior and oriented to capture images of a passenger seated on the seat and at least a portion of the movable panel of the window, and a controller processing the images to determine one or more characteristics of a face of the passenger. The controller further processes the images to monitor a position of the movable panel.

11 Claims, 3 Drawing Sheets

(56) References Cited

U.S. PATENT DOCUMENTS

| | | | |
|---|---|---|---|
| 2009/0022368 A1* | 1/2009 | Matsuoka | G06F 3/013 |
| | | | 382/103 |
| 2015/0319608 A1* | 11/2015 | Varughese | H04W 48/04 |
| | | | 455/456.4 |
| 2018/0126901 A1* | 5/2018 | Levkova | B60W 40/09 |
| 2021/0053418 A1 | 2/2021 | Kale et al. | |

* cited by examiner

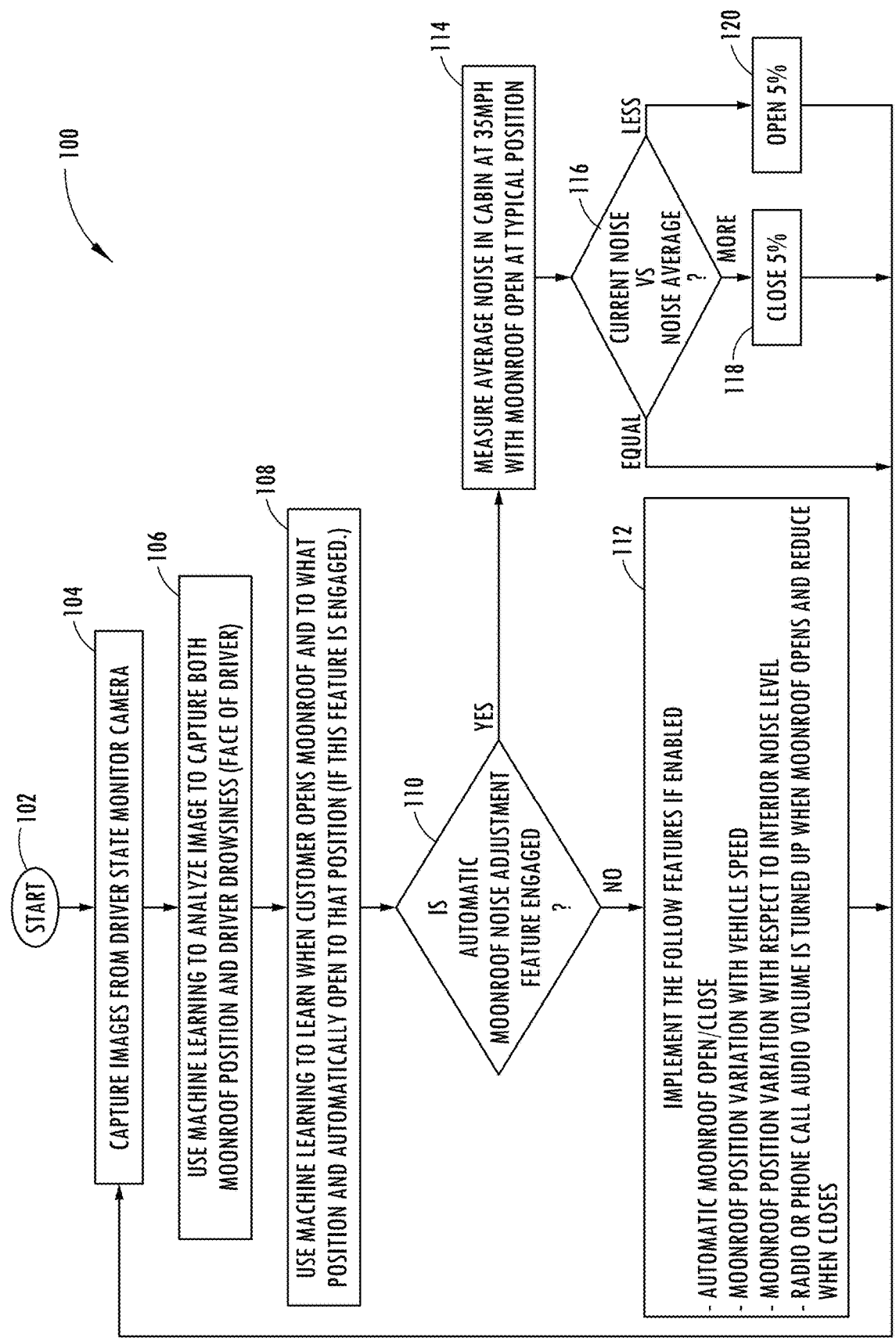

VEHICLE HAVING IMAGING DEVICE FOR DRIVER AND WINDOW MONITORING

FIELD OF THE DISCLOSURE

The present disclosure generally relates to vehicles having powered windows, and more particularly relates to monitoring the position of a window, such as a moonroof or sunroof, with an imaging device onboard a vehicle.

BACKGROUND OF THE DISCLOSURE

Motor vehicles are commonly equipped with power windows that are powered with an actuator such as an electric motor to move a movable panel between open and closed positions. Powered windows may include a moonroof or sunroof located in the roof of the vehicle. It would be desirable to monitor the position of a window, such as the moonroof or sunroof, with a cost-affordable monitoring system.

SUMMARY OF THE DISCLOSURE

According to a first aspect of the present disclosure, a vehicle is provided that includes a cabin interior, a seat configured to hold a passenger, a window having a movable panel actuatable between open and closed positions, and an actuator to power the window between the open and closed positions. The vehicle also includes an imaging device located in the cabin interior and oriented to capture images of at least a portion of a person seated on the seat and at least a portion of the movable panel of the window, and a controller processing the images to determine one or more characteristics of a face of the person, wherein the controller further processes the images to monitor a position of the movable panel.

Embodiments of the first aspect of the disclosure can include any one or a combination of the following features:
the seat comprises a driver seat configured for holding the person as a driver of the vehicle;
the imaging device is located forward of the driver seat and oriented to capture a head of the driver of the vehicle;
the controller processes one or more features of a face on the head of the driver and determines a state of the driver;
the imaging device is located in a dashboard of the vehicle;
a noise sensor located in the cabin interior for sensing noise level within the cabin interior;
the controller monitors the sensed noise level and controls the actuator to move the movable panel between the open and closed positions, wherein the movable panel is moved toward the closed position when the sensed noise level exceeds a threshold value;
the controller actuates the movable panel toward the open position when the sensed noise level is less than the threshold;
the window is located in a roof of the vehicle; and
the window comprises a moonroof or sunroof.

According to a second aspect of the present disclosure, a vehicle is provided that includes a cabin interior, a roof extending over the cabin interior, a driver seat configured to hold a driver, and a power window comprising a moonroof or sunroof located in the vehicle roof, the window having a movable panel actuatable between open and closed positions. The vehicle also includes an actuator to power the window between the open and closed positions, an imaging device located forward of the driver seat and oriented to capture a face of the driver in the cabin interior and at least a portion of the movable panel of the window, and a controller processing the images, wherein the controller determines one or more characteristics of the face of the driver, and wherein the controller further processes the images to monitor a position of the movable panel.

Embodiments of the second aspect of the disclosure can include any one or a combination of the following features:
the imaging device is located in a dashboard of the vehicle;
a noise sensor located in the cabin interior for sensing noise level within the cabin interior;
the controller monitors the sensed noise level and controls the actuator to move the movable panel between the open and closed positions, wherein the movable panel is moved toward the closed position when the sensed noise level exceeds a threshold value; and
the controller actuates the movable panel toward the open position when the sensed noise level is less than the threshold.

According to a third aspect of the present disclosure, a method of monitoring a seated driver and window position on a vehicle with an imaging device is provided. The method includes the steps of capturing images of at least a portion of a vehicle driver with an imaging device located within a cabin interior of the vehicle, the captured images including a movable panel of the movable window comprising a moonroof or sunroof in a roof of the vehicle, processing the captured images with an image processor, determining one or more facial characteristics of a driver seated in the seat based on the captured images, processing the captured images to determine a position of the movable panel, and generating an output indicative of the position of the movable panel.

Embodiments of the second aspect of the disclosure can include any one or a combination of the following features:
the output controls a motor actuating the window panel;
sensing noise level within the cabin interior with a noise sensor;
controlling an actuator to move the movable panel between open and closed positions based on the sensed noise level; and
the controller actuates the actuator to move the movable panel towards the closed position when the sensed noise level exceeds a threshold and to further actuate the movable panel toward the open position when the sensed noise level is less than the threshold.

These and other aspects, objects, and features of the present invention will be understood and appreciated by those skilled in the art upon studying the following specification, claims, and appended drawings.

BRIEF DESCRIPTION OF THE DRAWINGS

In the drawings:
FIG. 4 is a flow diagram illustrating a routine for monitoring the driver state and powered window by processing the images generated by the imaging device.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
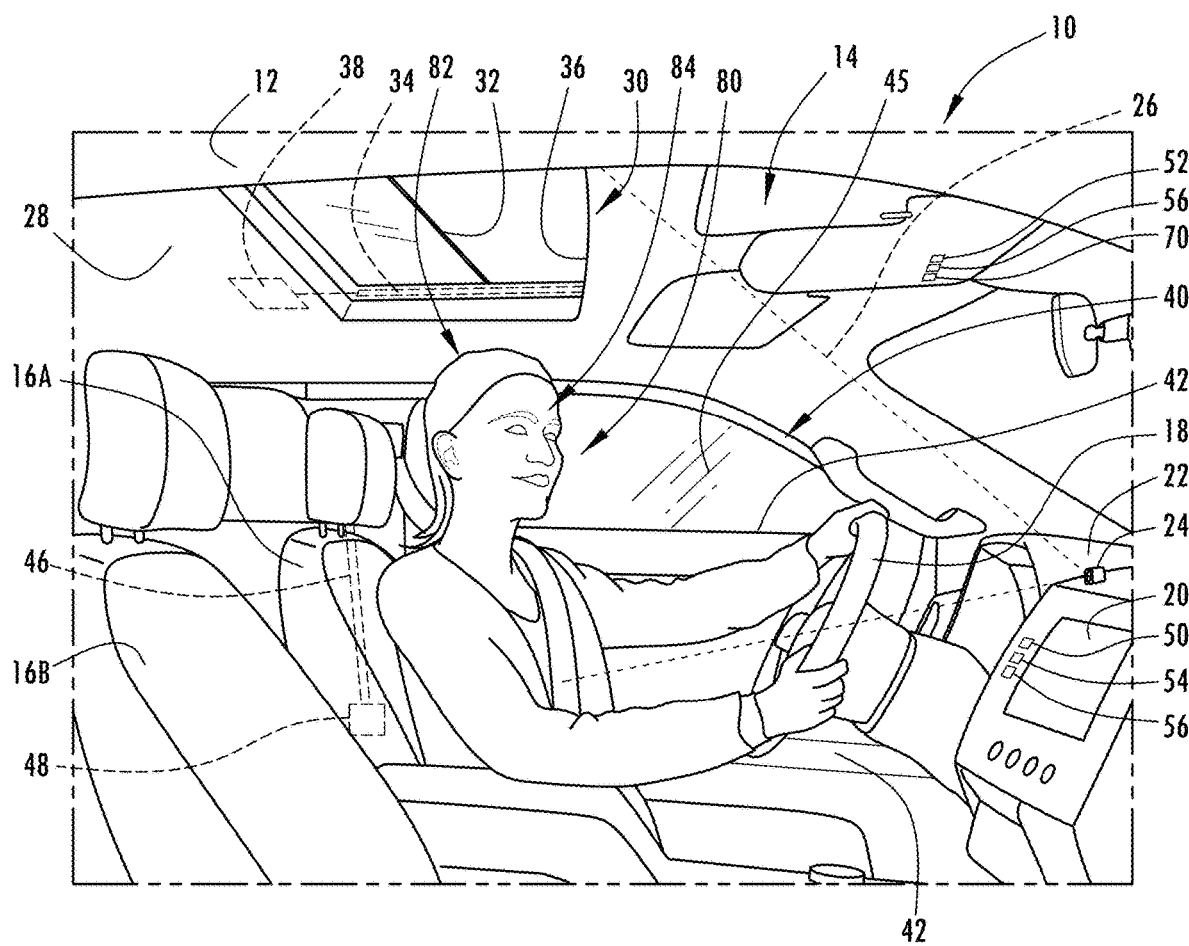
FIG. 1 is a side perspective view of a cabin interior of a vehicle equipped with an imaging device having an imaging field, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a powered window and an imaging device that monitors a seated person and the powered window. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated having a cabin interior 14 defined by a vehicle body 12 and configured with passenger seating for transporting persons including a driver in the vehicle 10 and non-driver passengers. The cabin interior 14 is generally defined by the vehicle body 12 and may include various features and trim components within the cabin interior 14. The cabin interior 14 may include an arrangement of seats including a first or front row of driver and passenger seats 16A and 16B generally located towards the front of the cabin interior 14. The cabin interior 14 may also include one or more rows of passenger seats located rearward of the front row of passenger seats. The vehicle 10 may be equipped with a steering wheel 18 located in front of the driver seat 16A to enable a person 80 seated as the driver to steer the vehicle road wheels and hence the path of travel of the vehicle 10. Additionally, one or more human machine interfaces (HMIs), such as a touchscreen display 20, audio speakers, microphone, etc., may be provided on the vehicle 10 to communicate with the driver and one or more passengers in the vehicle 10.

The driver seat 16A is generally positioned rearward of the steering wheel 18 and rearward of a dashboard 22. The dashboard 22 may have various components mounted thereto including instrument gauges, entertainment systems, user input controls, and the touchscreen display 20. In addition, an imaging device, such as a camera 24, is located in the dashboard 22 generally forward of the driver seat 16A, according to one example. The camera 24 is oriented vehicle rearward, that is in a direction from the dashboard 22 towards a rear of the cabin interior 14 of the vehicle 10, to capture images within an image field-of-view 26 containing at least a portion of the driver 80 of the vehicle 10 seated in the driver seat 16A. In addition, the camera 24 may capture at least a portion of a front passenger of the vehicle 10 seated in, for example, seat 16B. The camera 24 is oriented such that the image field-of-view 26 is directed towards the upper portion of the driver and may also include other front row occupants. In particular, the camera 24 is oriented to capture the head 82 and face 84 of the driver and other front occupant to be able to monitor a state of the driver 80, such as whether the driver 80 is potentially distracted, not facing in a desired direction, is drowsy, or other state based on the facial recognition of the driver's head 82 and face 84.

The motor vehicle 10 further includes a roof 28 generally above the cabin interior 14. The roof 28 has an opening 36 in the roof 28 in which a window 30 is installed. The window 30 may include a moonroof or sunroof, which may include a movable window panel 32 that moves within a track 34 in the opening 36 of the roof 28. The movable window panel 32 may be actuated by an actuator, such as an electric motor 38 to move the movable window panel 32 between open and closed positions. For example, the movable window panel 32 may be actuated from a forward closed position towards a rearward open position and vice versa.

The vehicle 10 further includes a plurality of doors, including passenger side doors 40 located on opposite lateral sides of the vehicle body 12 to allow ingress and egress of driver and passengers into and out of the cabin interior 14 of the vehicle 10. The doors 40 may pivot about hinges along a vertical axis and may swing outward to an open position and inward back to a closed position where they may be latched to the body 12 in the closed position. The doors 40 may include a door panel 42 and a movable window 45 that moves in a track 46 within the door panel 42. An actuator, such as an electric motor 48, may actuate the movable window 32 down and up between the open and closed positions, respectively, in response to a user input such as an input switch.

Figure 2:
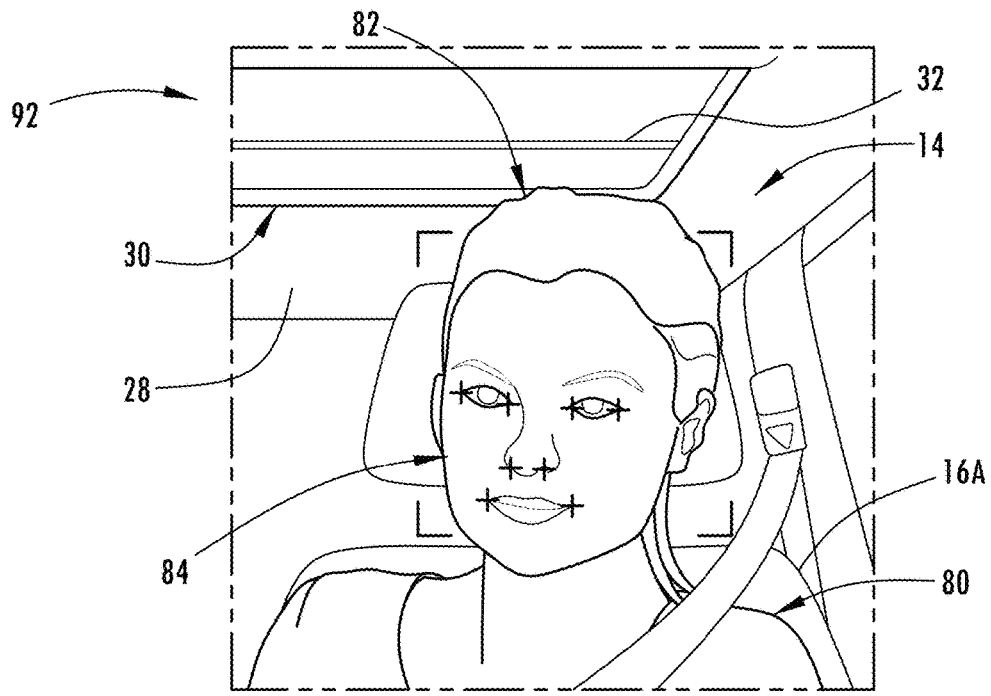
FIG. 2 is an image captured with the imaging device showing a head and face of a driver of the vehicle and a powered window.

Referring to FIG. 2, a captured image generated by the imaging device camera 24 is illustrated, according to one example. The camera 24 captures the image 92 within the field-of-view 26 proximate to the expected position of the upper body of a person, such as the driver 80 of the vehicle 10, sufficient to capture the head 82 and face 84 of the driver 80 or other front seating occupants. In addition, the captured image 92 also captures the movable panel 32 of the window which, in this example, is the moonroof or sunroof. As such, the field-of-view 26 of the imaging device 24 is sufficiently wide enough and oriented to capture both the face of the person and the movable window. The camera field-of-view 26 may extend vertically at a vertical angle of about 60° and may extend horizontally vertical at a horizontal angle of about 40°, according to one example. An image processor of the controller may process the captured image to determine the position and directivity of the head 82 of the person and facial characteristics of the face 84 of the person 80. The head 82 typically includes a person's ears on left and right sides and the face 84 typically includes eyes, eyebrows, nose, mouth and chin features. The controller processes the images and may compare the various features of the face 84 and head 82 of the driver 80 or other front seat occupants to known features stored in memory to recognize and identify the features, and hence the state and identity of the driver 80 or the identity of other front seat occupants.

In addition to capturing images of the head 82 and face 84 of the driver 80, the imaging device camera 24 is positioned and oriented to also capture images of at least a portion of the movable window panel 32 of the window shown as the moonroof or sunroof 30, according to one example. As seen in FIGS. 1 and 2, the camera 24 is oriented to provide an image field of view 26 capturing the head 82 and face 84 of the driver 80 and the movable window panel 32. This enables the captured images to be processed by a controller and used to monitor both the driver state and the position and movement of the movable window panel 32 without requiring additional hardware. The use of the camera 24 to monitor multiple features within the cabin interior 14 thereby advantageously enables cost savings.

Figure 3:
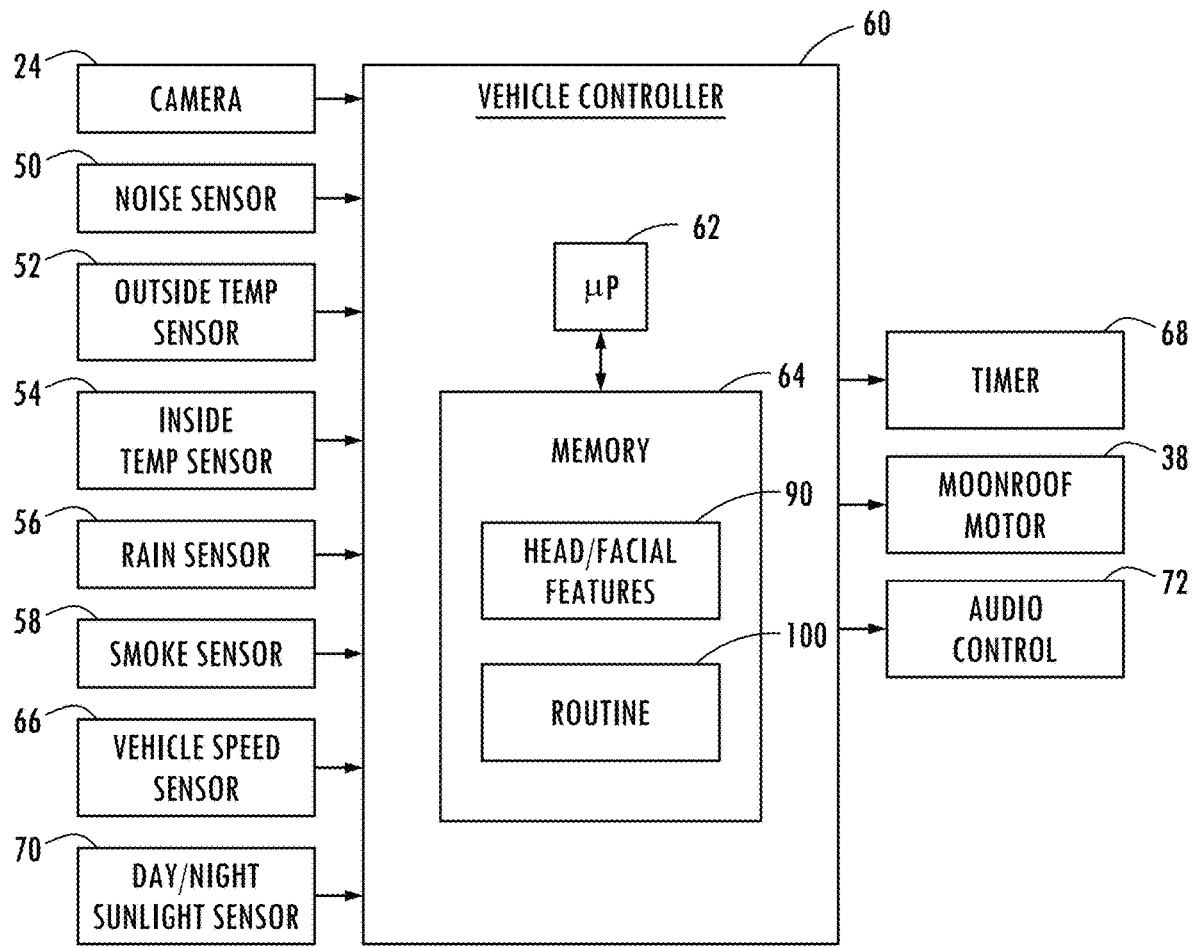
FIG. 3 is a block diagram of a vehicle controller configured to process the images generated with the imaging device to monitor the driver state and the powered window.

Referring to FIG. 3, the controller 60 may include image processing to process the captured images from the imaging device 24 and may compare the processed images with known facial characteristics of recognizable facial features of a person, i.e., a human being, such as the driver. For example, the captured images may be processed to determine the location of the eyes, ears, nose and mouth on a head 82 or face 84 of a driver. In addition, the facial recognition may identify the orientation of the head 82 of the driver 80. Further, the facial recognition may recognize the state of the driver's eyes such as whether the eyes on the face 84 are open or closed or whether the pupils of the eyes are positioned to look forward or to a side or up and down. As such, facial recognition may be able to identify the state of the driver to determine if the driver is attentive or distracted, and the identity of the driver.

The facial recognition may further be used to compare the captured images to known features on a movable window panel 32 associated with a window, such as a moonroof or sunroof 30. For example, known features of a movable window panel 32 may include the window panel itself, or a portion of the window panel, an edge of the window panel or a marking on the window panel, such that movement and position of the window panel may be monitored and used to control one or more vehicle related functions.

By knowing the position and movement of the movable window panel 32, operation of the movable window panel 32 may be controlled to open and/or close the movable window panel 30 automatically based on one or more sensed conditions. For example, the vehicle 10 may be equipped with an audible noise sensor 50 to sense noise in the cabin interior 14 and to control the actuator to move the movable panel 32 between the open and closed positions. The movable panel 32 may be moved toward the closed position when the sensed noise level exceeds a noise threshold and may be further moved towards the open position when the sensed noise level is less than the threshold or within a dead band that provides hysteresis. As such, the noise level in the cabin may be regulated. In another example, the vehicle 10 may be equipped with temperature sensors that include an outside temperature sensor 52 and an inside temperature sensor 54 and the sensed temperatures may be employed to control the opening and closing of movable window panel 32 to achieve a desired cabin temperature. Further, the vehicle 10 may be equipped with a rain sensor 56 which may sense the presence of rain or moisture which may be used to automatically move the movable window panel 32 to the closed position when rain or moisture is sensed. The vehicle 10 may further include a smoke detector 58 for detecting smoke within the vehicle interior 14 and may automatically open the movable window panel 32 when smoke is detected. Further, the vehicle 10 may include a vehicle speed sensor (VSS) 66 and may control the positioning of the movable window panel 32 based on the sensed vehicle speed. The vehicle 10 may further be equipped with a timer that may monitor the length of time since the vehicle was last keyed on. Further, the vehicle 10 may include a light sensor 70 for sensing daytime sunlight versus nighttime conditions which may be used to control the opening and closing of the movable window panel 32 or window tinting features to regulate the amount of light passing through the window. Information on local outside temperature, rain, smoke or smog, and daytime sunlight versus nighttime conditions may also be acquired through use of connectivity systems via the vehicles cellular Telematic Control Unit, V2V, or an occupant's smartphone paired to the vehicle.

Referring again to FIG. 3, the vehicle is shown having a vehicle controller 60 controlling the vehicle 10 and movable window panel 32. The vehicle controller 60 may include control circuitry, such as a microprocessor 62 and memory 64. It should be appreciated that the vehicle controller 60 may be comprised of analog and/or digital control circuitry. Stored in memory 64 is routine 100 for processing the images and monitoring the front row occupant, e.g., driver, state and position and movement of the movable window panel 32. In addition, stored features 90, such as facial recognition features associated with a driver and associated with a movable window may be stored in memory and used to recognize the driver state and the position and movement of the movable window panel 32. Further, it should be appreciated that stored features 90 may include prior stored data associated with the use of the vehicle from images captured in the past which may be used with machine learning to enhance the accuracy of the features used in the future.

The vehicle controller 60 receives various inputs from the imaging device 24, noise sensor 50, outside temperature sensor 52, inside vehicle temperature sensor 54, rain sensor 56, smoke sensor 58, vehicle speed sensor 66, timer 68, and day/night sunlight sensor 70. The controller 60 process the images generated with the imaging device 24 and the sensed signals, compares the captured images to the stored features, and executes one or more routines 100 to generate outputs. The controller 60 may provide outputs to the motor 38 for actuating the movable window panel 32 so as to control movement of the movable window panel 32. In addition, the controller 60 may provide outputs to the touchscreen display 20 and other HMI devices, such as audio speakers 72 to provide status information to the vehicle occupants. Further, controller 60 may provide an audio output through the audio speakers as to be able to control volume of audio devices within the vehicle based on the positioning of the movable window panel 32 as determined by the controller 60.

Referring to FIG. 4, the routine 100 for monitoring the driver state and the position and movement of the movable window is shown, according to one example. Routine 100 begins at step 102 and proceeds to step 104 to capture images from the driver state monitor camera. Next, at step 106, routine 100 uses machine learning software to analyze the images to capture both the moonroof position and the driver state, such as driver drowsiness features on the face of the driver. Next, at step 108, routine 100 uses the machine learning software to learn when the driver opens the movable window panel, e.g., moonroof or sunroof, and to what position and automatically opens the movable window panel 32 to that position if the feature is engaged. Routine 100 then proceeds to decision step 110 to determine if an automatic moonroof noise adjustment feature is engaged and, if so, measures an average noise level in the vehicle cabin interior at a designated vehicle speed, such as 35 mph, with the moonroof in the open typical position at step 114. The average noise level thereby establishes a threshold that may be used to compare noise in the cabin interior. Proceeding to decision step 116, routine 100 determines if the current noise level is equal to, more or less than the average noise level. If the current noise level is less than the average noise level, plus or minus a dead band routine 100 proceeds to open the movable window panel of the moonroof by a designated amount, such as 5% at step 120, before returning to step 102. If the current noise level is greater than the average noise level, plus or minus the dead band, routine 100 proceeds to step 118 to close the movable window panel of the moonroof by a designated amount, such as 5% before returning to step 104. If the current noise level is approximately equal to the average noise level within the dead band, routine 100 returns to step 104.

If the automatic moonroof noise adjustment feature is not engaged, routine 100 proceeds to step 112 to implement various features, if enabled. Such features may include an automatic moonroof open/closed action, a moonroof position variation with vehicle speed action, a moonroof position variation with respect to interior noise level action, or a radio or phone call audio volume being turned up when the moonroof opens and reduced when the moonroof closes. Thereafter, routine 100 returns to step 104.

While the vehicle 10 is shown and described herein utilizing a single imaging device 24 to capture images of a driver's face for use in determining a driver state and for also capturing images of a moonroof or sunroof in the roof of the vehicle for determining the position and movement of the movable panel, it should be appreciated that the imaging device may otherwise be configured to capture images of another window, such as a side window and one or more of the doors to monitor the position and movement of the side windows between the open and closed position.

Accordingly, the vehicle 10 advantageously employs a single imaging device, such as camera 24, to monitor both a state of one or more front row occupants, e.g., driver and a movable window. This enables the single camera to be utilized to determine the front row occupant's facial state and position and movement of the movable window. The use of a single camera results in a cost savings without requiring extra hardware or components.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
 a cabin interior;
 a seat configured to hold a passenger;
 a window having a movable panel actuatable between open and closed positions;
 an actuator to power the window between the open and closed positions;
 a noise sensor located in the cabin interior for sensing noise level within the cabin interior;
 a single imaging device located in the cabin interior oriented to capture images of at least a portion of a person seated on the seat and at least a portion of the movable panel of the window; and
 a controller processing the captured images from the single imaging device to determine one or more characteristics of a face of the person and determining a state of the person based on the determined one or more characteristics of the face of the person, wherein the controller further processes the captured images from the single imaging device to monitor a position of the movable panel and controls movement of the movable panel based at least in part on the monitored position of the movable panel, wherein the controller monitors the sensed noise level and controls the actuator to move the movable panel between the open and closed positions, wherein the movable panel is moved toward the closed position when the sensed noise level exceeds a threshold value, and wherein the controller actuates the movable panel toward the open position when the sensed noise level is less than the threshold.

2. The vehicle of claim 1, wherein the seat comprises a driver seat configured for holding the person as a driver of the vehicle.

3. The vehicle of claim 2, wherein the single imaging device is located forward of the driver seat and oriented to capture a head of the driver of the vehicle.

4. The vehicle of claim 3, wherein the controller processes one or more features of a face on the head of the driver and determines the state of the driver.

5. The vehicle of claim 3, wherein the single imaging device is located in a dashboard of the vehicle.

6. The vehicle of claim 1, wherein the window is located in a roof of the vehicle.

7. The vehicle of claim 6, wherein the window comprises a moonroof or sunroof.

8. A vehicle comprising:
a cabin interior;
a roof extending over the cabin interior;
a driver seat configured to hold a driver;
a power window comprising a moonroof or sunroof located in the vehicle roof, the window having a movable panel actuatable between open and closed positions;
an actuator to power the window between the open and closed positions;
a noise sensor located in the cabin interior for sensing noise level within the cabin interior;
a single imaging device located forward of the driver seat oriented to capture a face of the driver in the cabin interior and at least a portion of the movable panel of the window; and
a controller processing the images, wherein the controller determines one or more characteristics of the face of the driver and determines a state of the driver based on the one or more characteristics of the face of the driver, wherein the controller further processes the images to monitor a position of the movable panel, wherein the controller monitors the sensed noise level and controls the actuator to move the movable panel between the open and closed positions based on the monitored noise level, wherein the movable panel is moved toward the closed position when the sensed noise level exceeds a threshold value, and wherein the controller actuates the movable panel toward the open position when the sensed noise level is less than the threshold.

9. The vehicle of claim 8, wherein the single imaging device is located in a dashboard of the vehicle.

10. A method of monitoring a seated driver and window position on a vehicle with an imaging device, the method comprising:
capturing images of at least a portion of a vehicle driver with a single imaging device located within a cabin interior of the vehicle, the captured images including a movable panel of the movable window comprising a moonroof or sunroof in a roof of the vehicle;
processing the captured images from the single imaging device with an image processor;
determining one or more facial characteristics of a driver seated in the seat based on the captured images;
determining a state of the driver based on the determined one or more characteristics of the driver;
processing the captured images from the single imaging device to determine a position of the movable panel;
generating an output indicative of the position of the movable panel; and
sensing noise level within the cabin interior with a noise sensor; and
controlling movement of the moveable panel based at least in part on the position of the moveable panel by controlling an actuator to move the movable panel between open and closed positions based on the sensed noise level, wherein the actuator moves the movable panel towards the closed position when the sensed noise level exceeds a threshold and moves the movable panel toward the open position when the sensed noise level is less than the threshold.

11. The method of claim 10, wherein the output controls a motor actuating the window panel.

* * * * *